(12) United States Patent
West et al.

(10) Patent No.: US 11,582,968 B2
(45) Date of Patent: Feb. 21, 2023

(54) 3D SPACER TEXTILES FOR CROP PROTECTION AND INSECT CONTROL

(71) Applicant: North Carolina State University, Raleigh, NC (US)

(72) Inventors: Andre J. West, Raleigh, NC (US); Marian G. McCord, Raleigh, NC (US); Richard Michael Roe, Raleigh, NC (US); James Brian Davis, Raleigh, NC (US); Jiwei Zhu, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 287 days.

(21) Appl. No.: 16/258,574

(22) Filed: Jan. 26, 2019

(65) Prior Publication Data

US 2019/0230920 A1    Aug. 1, 2019

Related U.S. Application Data

(60) Provisional application No. 62/622,442, filed on Jan. 26, 2018.

(51) Int. Cl.
| | |
|---|---|
| *A01N 25/24* | (2006.01) |
| *A01N 25/34* | (2006.01) |
| *A01N 53/00* | (2006.01) |
| *A01N 31/02* | (2006.01) |
| *D04B 21/16* | (2006.01) |
| *D06M 13/224* | (2006.01) |
| *D06M 13/144* | (2006.01) |
| *D04B 21/20* | (2006.01) |

(52) U.S. Cl.
CPC ............. *A01N 25/34* (2013.01); *A01N 31/02* (2013.01); *A01N 53/00* (2013.01); *D04B 21/16* (2013.01); *D04B 21/20* (2013.01); *D06M 13/144* (2013.01); *D06M 13/2246* (2013.01); *A01N 25/24* (2013.01); *D10B 2403/033* (2013.01); *D10B 2505/20* (2013.01)

(58) Field of Classification Search
CPC ........ A01N 25/34; A01N 53/00; A01N 49/00; A01N 25/24; A01N 31/02; D04B 21/16; D04B 21/20; D06M 13/144; D06M 13/2246
USPC ....................................................... 424/407
See application file for complete search history.

(56) References Cited

U.S. PATENT DOCUMENTS

| | | | | |
|---|---|---|---|---|
| 5,048,228 | A * | 9/1991 | Neveu ................ | A01G 13/0231 47/29.1 |
| 2005/0113255 | A1* | 5/2005 | Schrader .................. | A01N 3/00 504/116.1 |
| 2010/0064578 | A1* | 3/2010 | Karl ........................ | A01G 13/10 47/58.1 FV |
| 2014/0041285 | A1* | 2/2014 | Russell .................. | D04B 21/04 43/132.1 |

(Continued)

*Primary Examiner* — David Browe
(74) *Attorney, Agent, or Firm* — Thomas|Horstemeyer, LLP

(57) ABSTRACT

A variety of agricultural spacer fabrics/textiles are provided that protect plants from insect penetration while allowing for light and air penetration, and methods of use. The textiles can be used alone or in conjunction with agents such as insecticides, insect repellants, and fungicides. The agricultural textile can have an outermost fabric layer, an innermost fabric layer, and a plurality of filaments connecting the outermost fabric layer and the innermost fabric layer.

14 Claims, 15 Drawing Sheets

(56) References Cited

U.S. PATENT DOCUMENTS

| | | | | |
|---|---|---|---|---|
| 2014/0080373 A1* | 3/2014 | Keitch | ............... | B32B 5/26 |
| | | | | 66/190 |
| 2017/0016152 A1* | 1/2017 | Goldberg | ............ | D03D 13/008 |
| 2017/0029989 A1* | 2/2017 | Tuscia | ............... | B32B 27/12 |
| 2017/0359967 A1* | 12/2017 | Tetrault | ............... | A41D 1/02 |

\* cited by examiner

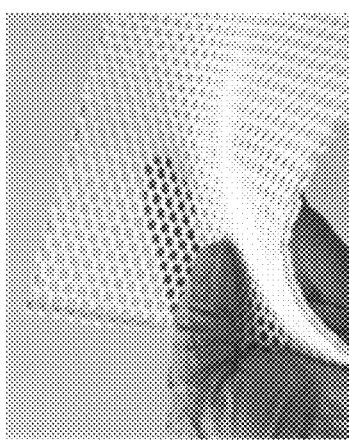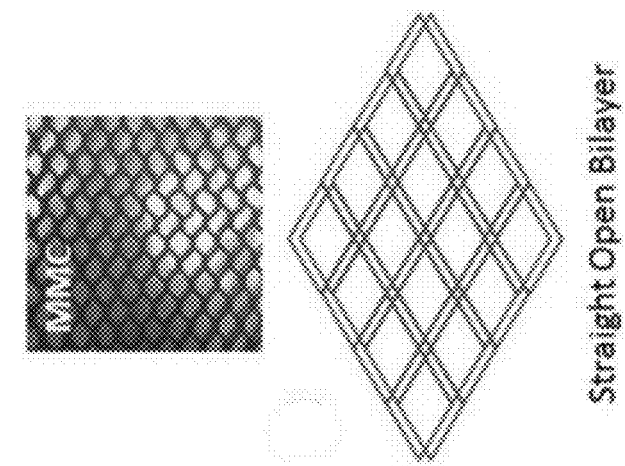
Fig. 3A Straight Open Bilayer
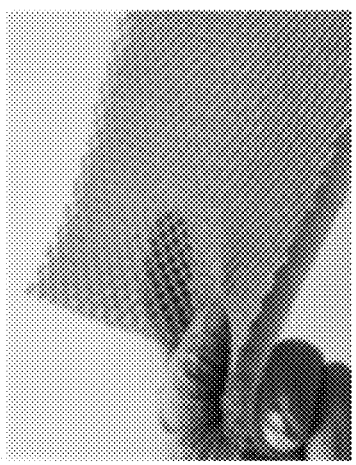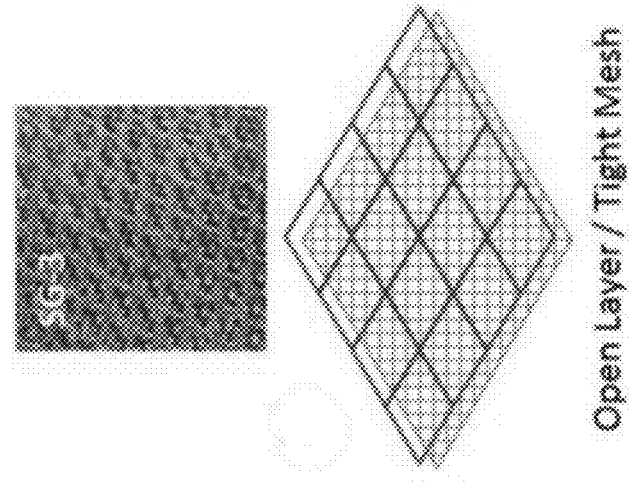
Fig. 3B Open Layer / Tight Mesh
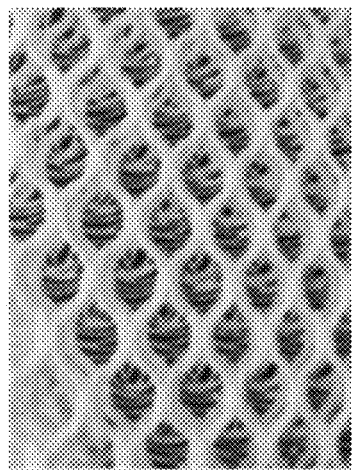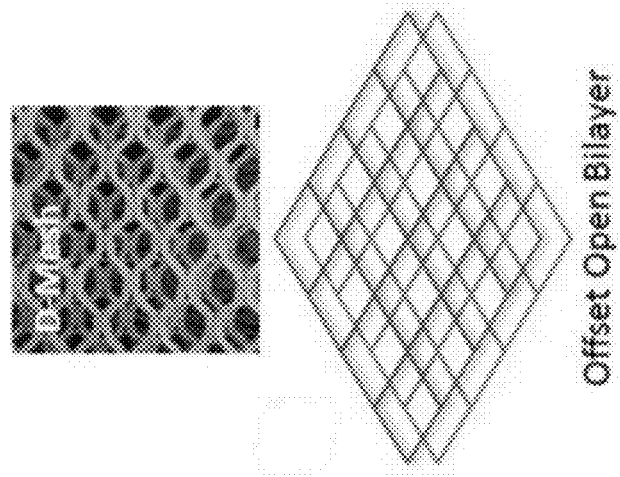
Fig. 3C Offset Open Bilayer

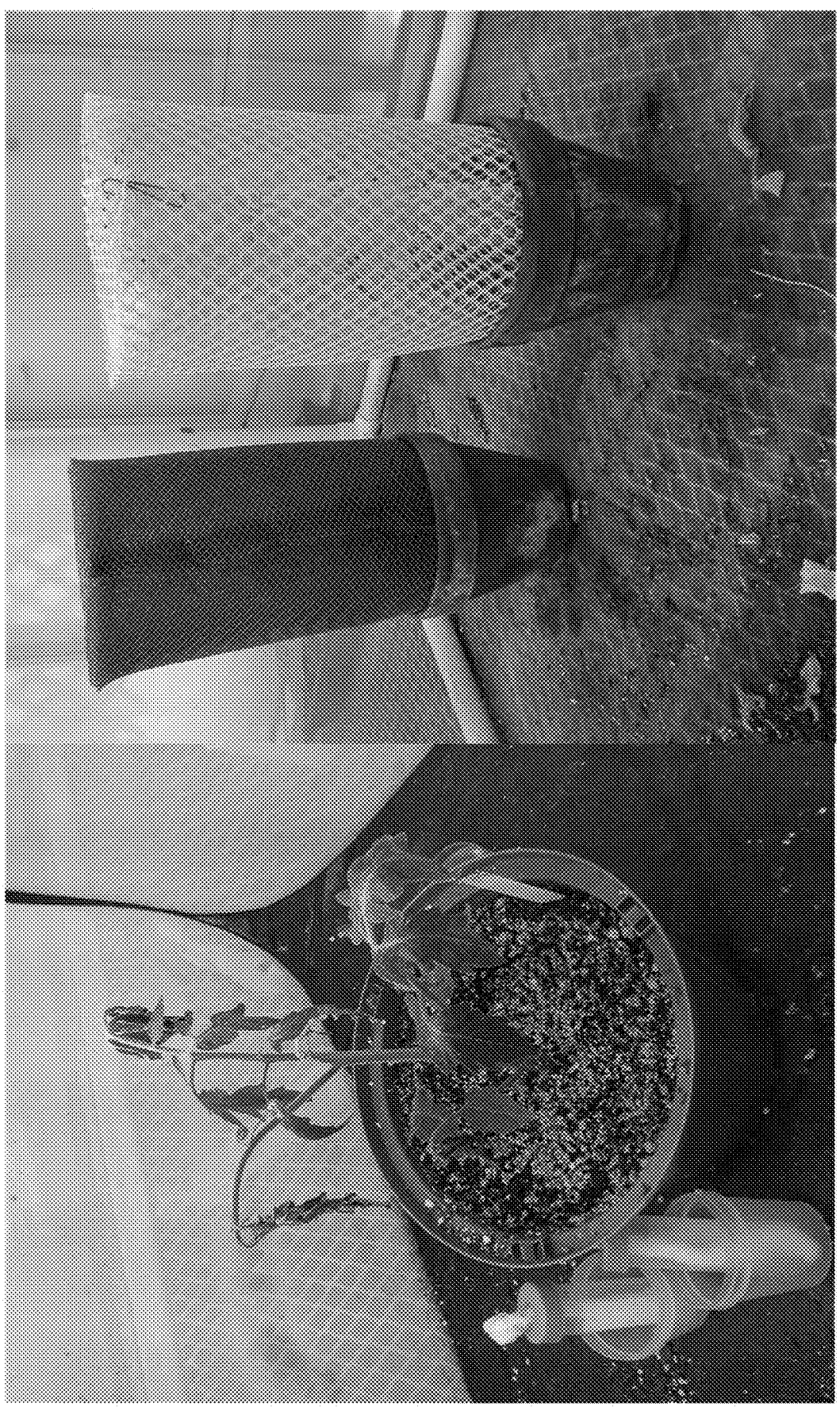

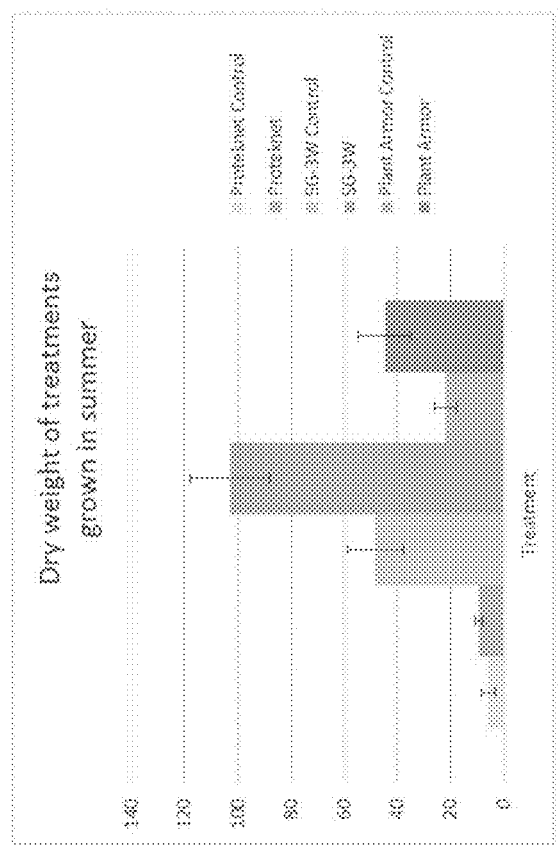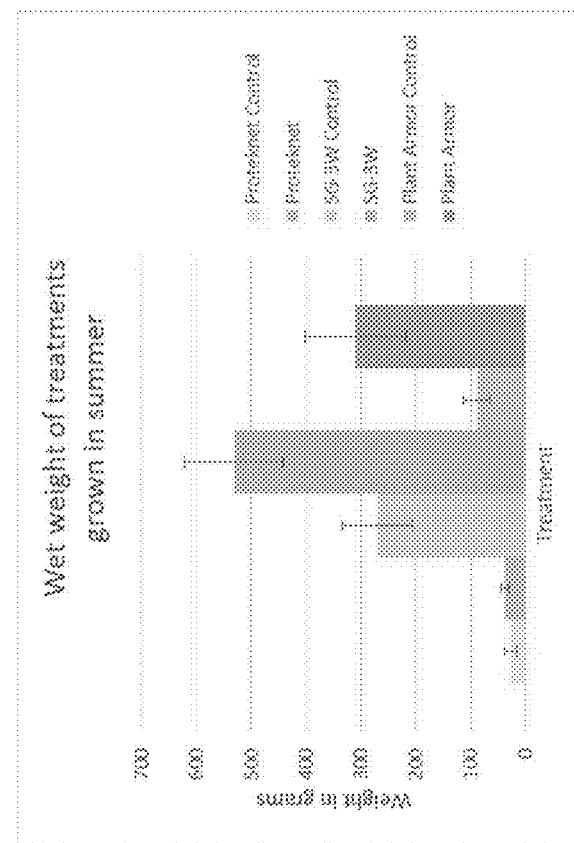

3D SPACER TEXTILES FOR CROP PROTECTION AND INSECT CONTROL

CROSS-REFERENCE TO RELATED APPLICATIONS

This application claims the benefit of and priority to U.S. Provisional Application Ser. No. 62/622,442, having the title "3D Spacer Textiles for Crop Protection and Insect Control", filed on Jan. 26, 2018, the disclosure of which is incorporated herein by reference in its entirety.

STATEMENT REGARDING FEDERALLY SPONSORED RESEARCH OR DEVELOPMENT

This invention was made with government support under grant number 2015-33610-23785 awarded by the United States Department of Agriculture's National Institute of Food and Agriculture. The government has certain rights in the invention.

TECHNICAL FIELD

The present disclosure generally relates to agricultural textiles and methods of making and uses thereof.

BACKGROUND

There is a wide variety of new insecticide classes, e.g., the neonicotinoids, natural spinosyns and their derivatives, indoxacarb, emamectin benzoate, the JH and ecdysteroid agonists, and others. In addition, we have the older pesticides like the organophosphates, carbamates, pyrethroids, and *Bacillus thuringiensis* (Bt). Furthermore, there are multiple Bt toxins and other proteins that are now genetically engineered into crops, initially into cotton and now expanded into corn and other commodities. These stacked Bt genes and others are being promoted as a method to prevent the evolution of target site insect resistance. New bacterial insecticides such as lipopeptides, which have similar effects on the insect digestive system to that of the Bts, have also recently been discovered. By the end of this decade, plants genetically engineered to produce dsRNA or siRNA and which use a RNAi approach for insect control are expected. Even microbial and yeast expression systems have been designed for the mass production of dsRNA for insecticidal sprays or in some plant species, for introduction as a systemic insecticide. The combined power of old and new pesticide technology is used as a part of integrated pest management (IPM) to minimize insecticide use by rotating modes of action and chemistry. However, all of these strategies may have unintended environmental, ecological and human/animal health consequences.

There remains a need for improved agricultural textiles that overcome the aforementioned deficiencies.

SUMMARY

A variety of agricultural spacer fabrics/textiles are provided that overcome one or more of the aforementioned deficiencies. In some aspects, the agricultural textile is provided having an outermost fabric layer, an innermost fabric layer, and a plurality of filaments connecting the outermost fabric layer and the innermost fabric layer. The outermost fabric layer can include a plurality of pores having a maximum pore size of about 50-100 mm. The thickness or average distance between the outermost fabric layer and the innermost fabric layer can, in some instances, be about 30-80 mm. In some aspects, the fabric can include clear monofilament yarn, which can be made from polyamide, polyester fiber, or other synthetic fiber and acts as the middle supporting tortuous structure. Various sizes of the monofilament can be utilized in the fabric construction that will have some bearing on the thickness of the material, weight, porosity, airflow and the UV filtration.

In some aspects the filaments are monofilaments, as monofilament pile yarns have proven to maintain a nearly constant fabric thickness and resiliency. This can result, in some instances, in an agricultural textile that is not easily compressible. Compression tests by using MTS (Materials testing system) have shown the fabrics can be reduced by up to 30% of its thickness with no significant change in pore size (less than 10% change in pore diameter) during the test. One or both of the outermost fabric layer and the innermost fabric layer can be warp or weft knitted.

The agricultural textile can include one or more additional agents that increase the effectiveness of the agricultural textile. For example, in some aspects, one or more of the outermost fabric layer, the innermost fabric layer, and the plurality of filaments can include a tackifier, an insecticide, a fungicide, an insect repellent, antimicrobial agent, or a combination thereof. The tackifier can be a polysaccharide gum, a gum rosin, a gum rosin ester, an aliphatic hydrocarbon resin, an aromatic modified aliphatic hydrocarbon resin, a wood rosin, a wood rosin ester, a tall oil rosin, a tall oil rosin ester, a polyterpene, an aromatic modified polyterpenes, a hydrogenated aliphatic resin, a hydrogenated aliphatic aromatic resin, or a combination thereof. The insecticide can include an organophosphate, a carbamate, a pyrethroid, or a combination thereof. Suitable pyrethroids can include permethrin, bifenthrin, cyfluthrin, fluvalinate, fen-propathrin, or a combination thereof. The insect repellent can be geraniol.

The agricultural textile can also have favorable water transmission and light transmittance properties that do not significantly hamper crop growth, or can even significantly enhance plant growth. In some aspects, the agricultural textile has a water vapor transmission rate of about 5000 g/day*$m^2$ to about 8000 g/day*$m^2$. In some aspects, the agricultural textile has a light transmittance of about 25% to about 60%.

Methods of using the agricultural textiles are also provided. For example, methods are provided for inhibiting insect damage in a crop in need thereof by applying an agricultural textile described herein to cover the crop. Methods of using the agricultural textiles are also provided. For example, methods are provided for inhibiting insect damage in a crop in need thereof by applying an agricultural textile described herein to cover the crop. In some aspects, the method results in an at least 50% or at least 70% reduction in insect physical contact with the plant, soil or other surfaces under the cover as compared to the insect contact with the same crop plant, soil and other surfaces under the otherwise same conditions except without the agricultural textile.

Part of the textile mode of action is to reduce insect contact with the plant. In addition to providing a physical barrier to exclude insect contact with surface under the textile, the insect's physical effort to cross the textile barrier, even if successful, impairs the insect from inflecting adverse effects on the plant or any other materials under the textile surface. Adverse effects as examples could include the transmission of microbes (e.g. bacteria, viruses, fungi), plant damage cause from feeding or nesting, etc. The insect effort to move across the textile barrier reduces the insect fitness by a number of mechanisms, for example, dehydration, starvation, reducing energy reserves, physical damage to the insect cuticle and other structures, disruption of reproduction, increasing developmental time from the optimum, etc. Another part of the textile mode of action is to make the plant and area covered by the plant invisible to the insect. This invisibility occurs both in a microscale of the area just covered by the textile but also on a macro scale, field scale, or regional scale, by making the plant growing system (the system includes in part the crop plant) 20% to 100% invisible to the insect. The invisibility and adverse effects would include not only the larval and adult stage of the insect, but also the ability of adults to recognize the area covered by the textile and oviposit eggs either on the system or the textile itself. The insects would have a failure to recognize the area on a macro scale as defined above. Invisibility to the insect, as used herein, is not limited to vision in any wavelength but all insect sensory systems including olfaction, thermal, tactile and sound. Also, the textile barrier mode of action disrupts the insect microbiome including microorganisms that are important to the normal insect functions for life processes and also includes microbes that might produce adverse effects to plants, soil, etc. covered by the textile. The above is also not limited to insects but also to any organism (including other arthropods such as mites as one example), plants (for example weeds and seeds that once germinated become weeds), vertebrate animals (for example, deer or any animal that might cause damage to the area covered by the textile) or microbes thereon and transmitted by air or other physical methods. The possible protection mechanisms are as already described above. Insect penetration, as used herein, includes insects landing on the plant or surrounding soil, eating the plant, or insect eggs/and or larvae present on the plant or surrounding soil.

In some aspects, the method does not have a significant negative impact on crop growth. For example, in some aspects, the crop has a growth rate over a period of time that is within about 20%, preferably within about 10%, of a growth rate of the otherwise same crop grown under the otherwise same growing conditions except without the agricultural textile. Crop growth rate otherwise is enhanced over crops that are not covered by the textile because of reduced access (as defined above) to the plants or other materials like soils as one example, that are covered by the textile and the adverse effects this access has on plant growth as described earlier. The textile also enhances plant production by additional modes of action, for some examples, by reducing plant stress from heat, reduced water availability, high water availability, high light levels, damaging wavelengths of light, low temperature, low water levels in the soil, high levels of water in the soil, wind damage, rain damage, snow damage, hail damage, plant diseases, changes in the ecosystem microbiome, etc. The methods can be applied to a variety of crops and to inhibit damage by a variety of insects. For example, the methods can be applied to a green, an eggplant, a brassicas, a bean, a squash, a cucumber, a bush, a tree or a tomato. The methods can inhibit insect damage caused by a nematode, a harlican bug, a beetle, a tobacco budworm, a green peach aphid, a tobacco thrips, a two-spotted spider mite, or a combination thereof. This spacer fabric can act as a shield for crops or any plant or plant product from those insects, while not taking away from the energy sources crops needs to grow or be preserved once removed from the growth phase of plant production.

In some aspects, the agricultural textile is self-supportive (FIG. 1) and also provides a physical protection barrier to rain and hail damage. In a self-supportive textile, the fabric can be sewn or knitted with inserted channels. These channels allow the insertion of a framing mechanism made from PVC pipe or hooped metal to form an enclosure higher than the plant height. This self-supportive structure is made possible because of the unique textile structure of the described herein that achieves plant, soil and general favorable plant ecosystem dynamics and the ability to integrate structural support into the textile which is needed to achieve separation of the textile from the plant and soil. Also, this textile structure and support increases the durability of the textile by providing multiple layers of protection to prevent failure of plant protection and to increase the reuse of the textile (an extended use of the textile not typical of the current state of the art). This capability also provides textile utility not typical of the current state of the art and extends applications from commercial applications to urban uses. One example includes home owners and home gardening with readymade products for specific types of home gardening products. One such example would be for use with easy to grow tomatoes in most urban landscapes.

Other systems, methods, features, and advantages of agricultural textile and methods of use thereof will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

FIGS. 3A-3C depict exemplary embodiments of warp knitted 3D spacer fabric materials and structures including an open bilayer structure (FIG. 3A), and open on top with mesh structure (FIG. 3B) and an offset open bilayer structure (FIG. 3C).

FIG. 8 is an image of a control plant as the plant has begun to die.

FIG. 9 is an image of an experimental setup.

FIGS. 14A and 14B show results of summer growth studies.

DETAILED DESCRIPTION

Figure 1:
FIG. 1 is a picture of row covers being used for crop coverage.

Textiles offer a non-chemical, non-biological approach to plant protection, but currently available products are not optimized as a physical/mechanical barrier to insects, nor do they utilize additional modes of action that contribute to an improved environment for plant growth. In various aspects, agricultural textiles are provided including a spacer fabric designed to inhibit or completely prevent penetration of damaging insects while providing adequate water and light transmission properties for crop growth. The agricultural textiles can be applied to a variety of crops to inhibit damage by a variety of insects. For example, in some aspects, the agricultural textiles can be applied to a green, an eggplant, a brassicas, a bean, a squash, a cucumber, or a tomato. In some aspects, the agricultural textiles can inhibit insect damage caused by a nematode, a harlican bug, a beetle, a tobacco budworm, a green peach aphid, a tobacco thrips, a two-spotted spider mite, or a combination thereof. This spacer fabric can act as a shield for crops from those insects, while not taking away from the energy sources crops needs to grow. In some aspects, the agricultural textile is self-supportive (no frame required) and also provides a physical protection barrier to rain and hail damage.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by reference as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of textiles engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

Agricultural Textiles and Uses Thereof

The general public is increasingly demanding their food be produced in the absence of synthetic insecticides, i.e., both chemicals and from plant transgenesis, as can be seen by the increase in retail sales for organic produce. In some regions like Europe, plant transgenic technology for insect control has been completely banned, and the public in toto has rejected the consumption of genetically modified plant and animal products. The neonicotinoids have also been discontinued in Europe, because of their perceived impact on the decline of honey bee populations (colony collapse disorder). If this ban results in an increase in the bee populations, there is at least a small chance the same ban could occur in the US and other regions. This would be highly problematic for agriculture since the neonicotinoids have been transformative due to their plant systemic activity, their persistence in and on plants, and their activity for the control of sucking pests like thrips, white flies, and aphids.

Textiles can be used in two general methods for insect control in agriculture: fencing and for crop coverage. The advantage of crop coverage with a textile is the potential for total exclusion of all pest insects without the use of insecticides or with insecticides or other killing agents limited to the textile. Textiles currently used in agriculture for crop protection operate by size exclusion. The openings in the textiles (its pore size) are smaller than the insect and exclude the insect from moving from the environment to the protected plant. Although on the surface, this approach might appear optimum, there are also limitations. For example, some insects and mites are so small, it is difficult to exclude them without an almost solid barrier (Natwick and Laemmelen, 1993) which has a negative impact on the plant. In Israel, tomatoes are grown under fine mesh nets to protect them from the sweet potato whitefly, Bermisia tabaci, and the tomato yellow leaf curl virus. While it effectively protects the plants from these insects, it also affects the plant growth due to heat build-up and poor ventilation. In addition to insect exclusion, textiles covering crops limit sun and rain penetration and can trap water around the plant; at the same time they can protect the plant from too much sun, wind, hail and animals like birds. The textile surface properties such as color and odor (or lack of plant odorant and gustatory properties) can make the plant invisible to the insect. While the use of insecticides or repellents in textiles for insect control in agriculture is currently not widely used, it could provide several major benefits: overall lower insecticide use, increased insecticide persistence for longer control, improved targeting of pesticides and eliminate drift from chemical sprays.

A variety of agricultural spacer fabrics/textiles are provided that overcome one or more of the aforementioned deficiencies. In some aspects, the agricultural textile is provided having an outermost fabric layer, an innermost fabric layer, and a plurality of filaments connecting the outermost fabric layer and the innermost fabric layer. The outermost fabric layer can include a plurality of pores having a maximum pore size of about 50-100 µm. The thickness or average distance between the outermost fabric layer and the innermost fabric layer can, in some instances, be about 30-80 mm. In embodiments, the outermost fabric layer can be about 0.2 to about 0.5 mm or about 0.5 to about 2 mm thick; the innermost fabric layer can be about 0.2 to about 0.5 mm or about 0.5 to about 2 mm thick. One or both of the outermost fabric layer and the innermost fabric layer can be warp knitted. One or both of the outermost fabric layer and the innermost fabric layer can be weft knitted. In embodiments, the outermost and innermost fabrics can each include multifilament polyester with a denier of about 60 to about 100 denier or about 70 denier. Bright (e.g. smooth and highly reflective) polyester can be used to decrease the opacity. Low $TiO_2$ filaments can be used.

In some aspects, the filaments (also referred to as spacer feeds or spacer filaments) connecting the outermost and innermost fabric layers are monofilaments as monofilament pile yarns have proven to maintain a nearly constant fabric thickness and resiliency. In various embodiments, the spacer filaments can be monofilament polyester fibers with a denier of about 5 to 25 denier, about 8 to 20 denier, about 19 denier or about 9 denier. This can result, in some instances, in an agricultural textile that is not easily compressible. Compression tests by using MTS (Materials testing system) have shown the fabrics of the present disclosure can be reduced by up to 30% of its thickness; there was no significant change in pore size during the test. In various embodiments, the spacer fabrics or agricultural textiles described herein can have a weight of about 20 to 50 grams per square meter, or about 14 grams per square meter.

Figure 2:
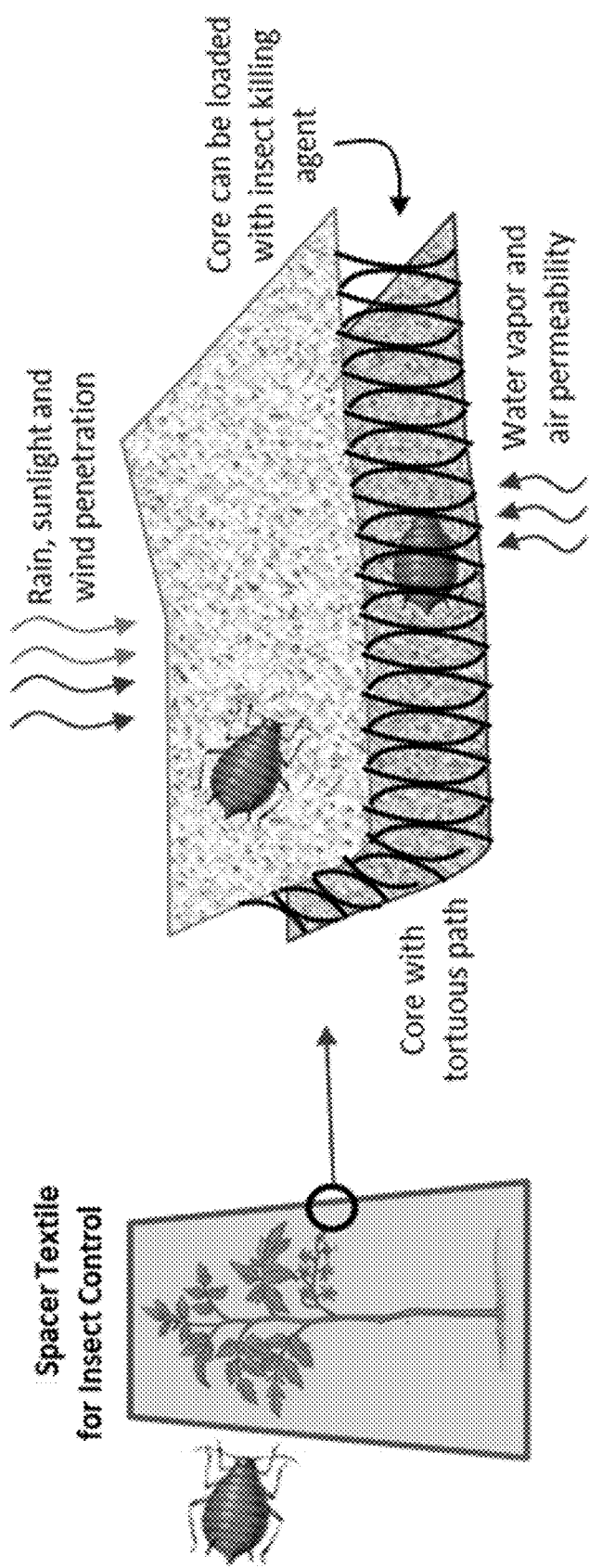
FIG. 2 is an image depicting an exemplary embodiment of a spacer textile for insect control.

Spacer fabrics were developed with optimized textile porosity to provide an open structure that allows light, water and wind penetration while providing a tortuous path to prevent insect penetration (FIG. 2). These textiles have been evaluated with and without non-toxic (physical) insect killing agents, tackifiers, and repellents. These spacer fabrics maximize insect exposure to these agents, yet prevent their contamination of the plant, grower and beneficial insects like honey bees. This fabric will have superior properties for insect resistance compared with current commercial agricultural fabrics in the areas of improved insect capture, repellency, or kill, while maintaining excellent light, air, and moisture transmission resulting in optimal plant growth. The 3D spacer fabric technology has considerable advantages over competitive insect control technologies with regards to environmental friendliness and a superior combination of insect barrier and air/water/light transmission. In addition, there are potentially harmful effects for local environments from extended use of these chemicals. This approach is entirely chemical free, relying on the unique geometry of the 3D spacer textile to mask the location of plants without any toxic effects. Other insect control technologies rely on presenting a physical barrier such as plastic sheet, nonwoven cloths or netting to surround the plants. This is similar to our method, however these materials can have negative effects on the plant growth by limiting air, light and water transmission. Additionally, these fabrics or nets do not make the plant invisible to the insects, leading to second generation larval infestation when the initial adults spawn their young within the fibers of the barrier products. In various aspects, the outermost fabric layer and the innermost fabric layer do not shear towards each other, as shearing can lower the thickness and change the porosity of the textile. In various embodiments, the fabric layers can withstand abrasion according to the Martindale Abrasion test from about 12000 to about 60000 Martindale cycles.

The agricultural textile can include one or more additional agents that increase the effectiveness of the agricultural textile. For example, in some aspects, one or more of the outermost fabric layer, the innermost fabric layer, and the plurality of filaments include a tackifier, an insecticide, a fungicide, an antimicrobial agent, an insect repellent, or a combination thereof. The tackifier can be a polysaccharide gum, a gum rosin, a gum rosin ester, an aliphatic hydrocarbon resin, an aromatic modified aliphatic hydrocarbon resin, a wood rosin, a wood rosin ester, a tall oil rosin, a tall oil rosin ester, a polyterpene, an aromatic modified polyterpenes, a hydrogenated aliphatic resin, a hydrogenated aliphatic aromatic resin, or a combination thereof. The insecticide can include an organophosphate, a carbamate, a pyrethroid, or a combination thereof. Suitable pyrethroids can include permethrin, bifenthrin, cyfluthrin, fluvalinate, fen-propathrin, or a combination thereof. The insect repellent can be geraniol.

The agricultural textile can also have favorable water transmission, air permeability, and light transmittance properties that do not significantly hamper crop growth or can even enhance growth. In some aspects, the agricultural textile has a water vapor transmission rate of about 400 g/day*m$^2$ to about 600 g/day*m$^2$, about 15 to about 25 g (H$_2$O)/m$^2$/hr or about 17 to 21 g (H$_2$O)/m$^2$/hr. In some aspects, the agricultural textile has a light transmittance (also referred to as light penetration of about 25% to about 80% or about 75%. In various embodiments, the air permeability of the agricultural textile can be from about 450 to about 1000 ft$^3$/ft$^2$/min or about 490 ft$^3$/ft$^2$/min.

Methods of using the agricultural textiles are also provided. For example, methods are provided for inhibiting insect damage in a crop in need thereof by applying an agricultural textile described herein to cover the crop. In some aspects, the method results in an at least 50% or at least 70% reduction in penetration of the insect as compared to the insect penetration of the otherwise same crop grown under the otherwise same conditions except without the agricultural textile. In some aspects, the method does not have a significant negative impact on crop growth. For example, in some aspects, the crop has a growth rate over a period of time that is within about 20%, within about 15%, within about 10%, or within about 5% of a growth rate of the otherwise same crop grown under the otherwise same growing conditions except without the agricultural textile. The growth rate can be compared over a specific period of time, for example over about 3 weeks, 2 weeks, 10 days, 1 week, or 5 days, or any interval therein. In some aspects, the growing conditions include growth in a controlled greenhouse at about 40% relative humidity and substantially free of damaging insects.

The methods can be applied to a variety of crops and to inhibit damage by a variety of insects. For example, the methods can be applied to a green, an eggplant, a brassicas, a bean, a squash, a cucumber, or a tomato. The methods can inhibit insect damage caused by a nematode, a harlican bug, a beetle, a tobacco budworm, a green peach aphid, a tobacco thrips, a two-spotted spider mite, or a combination thereof. This spacer fabric can act as a shield for crops from those insects, while not taking away from the energy sources crops needs to grow. In some aspects, the agricultural textile is self-supportive (no frame required) and also provides a physical protection barrier to rain and hail damage.

In various embodiments, the agricultural textile can prohibit insect and larval penetration by about 50% to 100%. In various embodiments, the agricultural textile can decrease the rate of insect penetration over that of single layer agricultural textiles by about 400%.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Spacer fabrics are demonstrated with optimized textile porosity to provide an open structure that allows light, water and wind penetration while providing a tortuous path to prevent insect penetration. In our greenhouse study, the spacer fabric covered tomato plants were rendered "invisible" to insect populations and were effectively ignored. These spacer fabrics reduce contamination of the environment and food by the elimination or better targeting of pesticides. The results demonstrate the ability to block access of the plant to harmful insects without use or any chemical treatment. Some iteration of these spatial fabrics can be used for organic farming, row crops especially for high value plants, horticulture plant production, green house production, home gardening, product storage and transport, and other applications.

Material and Methods

Insects:

Tobacco budworm, *Heliothis virescens*, eggs and pupaes were purchase from Benzon Research Inc. Carlisle, Pa. At the start of experimentation, the eggs were 2-3 days old.

3D Spacer Fabric:

A first generation 3D spacer fabric design was identified to maximize insect exposure to the fabric core and textile porosity for optimum plant growth and development. The design strategy to develop comfortable, insect resistant textiles uses application of knowledge about 2D textiles. Hybrid multilayer textiles and 3D spacer fabrics are the two approaches that were investigated, both of which include at least two layers of 2D fabrics. The protective effect is determined by maximum pore size of the outermost fabric as well as fabric thickness, while light transmission is mainly determined by pore size per fabric area and a combination of filament composition, filament size, and fabric structure. Target values or value ranges for air and moisture transfer were identified. For each hybrid multilayer textile, a different combination of layers was selected from commercially available materials. The minimum configuration is one outside layer, which can be in contact with insect pests, and one inside layer, closest to the plant. Further configurations will involve adding an intermediate layer. These layers were combined using traditional textile bonding techniques such as needle punching, stitch bonding, ultrasonic bonding, etc. Spacer fabrics acquired in this effort were warp knitted, because surface porosity can be widely adjusted to a much greater extent than for woven spacer fabrics. For each spacer fabric sample matrix, a different combination of layers was selected. Spacer fabrics always have three layers; two surfaces and one connecting layer. The connecting layer consists of pile yarns that keep both surfaces at a predetermined distance.

Three 3D spacer textiles (FIGS. 3A-3C) with different thicknesses, pore sizes and outer layer combinations were acquired from commercial sources, including two from domestic textile mills. Monofilaments were used as pile yarn as these have proved to be the best material to maintain a constant fabric thickness and resiliency. The samples demonstrated different pile yarn patterns depending on number of stitch courses and stitch wales per area. All patterns examined were selected in such a way that the fabrics could not be easily compressed and fabric surfaces did not shear towards each other. In terms of air transfer, it was expected that a low number of pile yarns per area would result in a highly air-permeable, but easier-to-compress pile yarn layer, while an increased number of pile yarns would increase tortuosity, and thereby effectiveness, but decrease thermal and moisture permeability.

3D Spacer Fabric Treatment

Example application of textile additives: A 500 mL plastic bottle was charged with 3.00 grams of 2-undecanone dissolved in 250.0 grams of a low-boiling solvent (acetone, tetrahydrofuran) and set aside. To this bottle, additional repellents (geraniol), insecticides (permethrin) or polymer tackifiers (various) could be added to produce a solution in the range of 1-2% additive concentration by weight. This was done to simulate a loading of 3-4% by weight per sample of 3D spacer fabric after spray application.

Permeability Testing

Materials were characterized using TLC, FT-IR and NMR to determine purity and structure. Thermal analyses were performed using a TA Instruments Q100 DSC (Differential Scanning calorimeter) and a TA Instruments Q500 TGA (Thermal Gravimetric Analyzer). FT-IR data was collected using a Perkin-Elmer Spectrum 2 spectrophotometer equipped with an ATR Diamond attachment. Light transmission was measured on a BYK Haze-Gard Plus light and haze meter. Moisture vapor transmission rate was determined according to ASTM standard test procedures. Particle size distribution of wet or dry particles (10 nm-3 mm in diameter) was measured with Mie Scattering using a Horiba LA-950 Light Scattering analyzer. This analysis will measure the average size and particle size distribution.

Petri Dish Testing

Figure 4A:
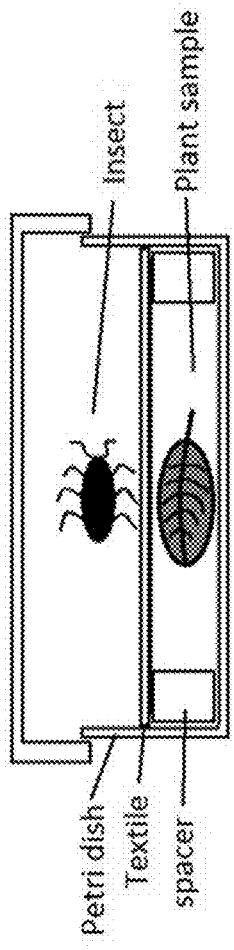
FIG. 4A is a diagram of the test system for preliminary testing of 3D spacer fabrics for insect control.

The test system utilized a plastic petri dish (12.6 cm$^2$) for the base and 3D spacers constructed from soft plastic (described previously in Stell et al. 2013) to serve as a shelf for the 3D spacer fabric test samples (FIG. 4A). The plastic 3D spacer prevented direct contact of the leaf with the test fabric; the 3D spacer thickness places the fabric within 10 mm or less of the leaf surface. A leaf disc covering the entire bottom of the test system was placed on top of three layers of wet filter paper (Whatman No. 1). The wet filter paper kept the humidity high in the test device during the 24 hr incubation period which was important to maintaining the viability of the leaf and insects. Insects are then transferred with a camel hair brush to the exposed top surface of the textile (20 insects per test arena), the top of the petri dish was used to cover the area, and the edges of the petri dish were sealed with parafilm. For these studies, the textile being evaluated was powder coated with dried egg protein and used as a marker to measure insect contact with the textile as the insect migrated from above the cloth to the tomato leaf surface.

Cage Penetration Assay

Figure 4C:
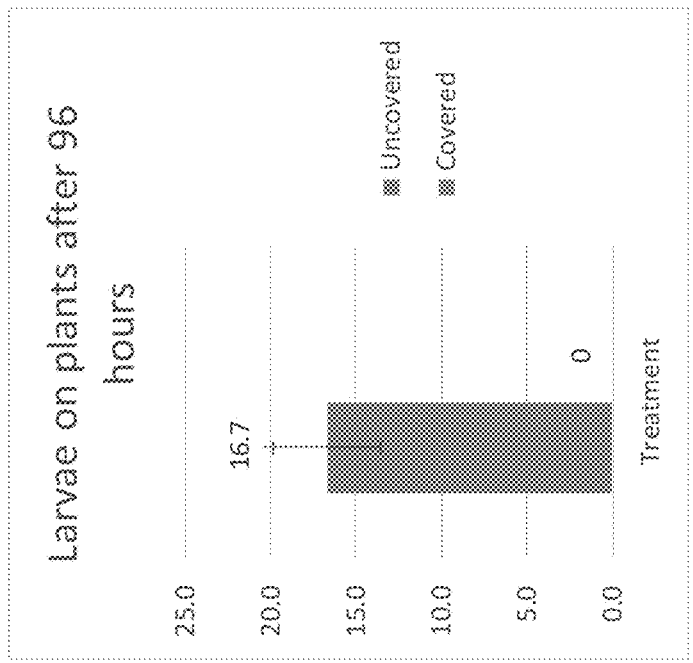
FIGS. 4B and 4C show results from a Cage Penetration assay using Plant Armor fabric.
Figure 4B:
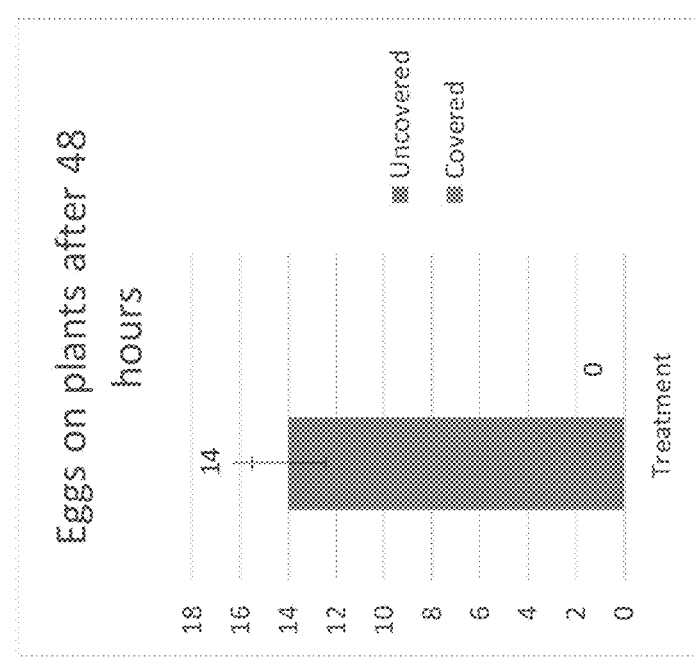

In a cage penetration assay, six plants were placed into an escape proof cage, three uncovered and three covered by sealed Plant Armor along sides and base (in a laboratory incubator). Fifteen pairs of adult *Trichoplusia ni* were released into the cage and allowed to mate and lay eggs. Forty eight hours after introduction, eggs present on the cloth and plants were counted (FIG. 4B). After ninety six hours the plants were removed from the cage, uncovered, and larvae on each plant were counted (FIG. 4C). Neither eggs nor larvae were present on the Plant Armor covered plants at the end of the assay, whereas uncovered controls showed an average of 14 eggs and 16.7 larvae.

Greenhouse Testing

These experiments were conducted in separate cages infested with adult moths (*Heliothis virescens*, 5 female and 5 male). Tomato plants growing in pots and pest free were covered in toto with the textile with the cloth sealed to the top rim of the pot with an elastic band and adhesive tape/clips to prevent insect movement between the pot and cloth. These covered plants then were introduced into the infested cage and incubated under 18 hours of light: 6 hours darkness (18:6 L:D) conditions in the green house for up to 14 days. The pest insects during this time period were given the opportunity to migrate toward the covered plants. The infested plants were not watered to enhance movement to the uninfested plants. In the case of the adult moths, they were able to lay their eggs anywhere in the cage (which only contained the covered tomato plants) over a two day period. The eggs were allowed to hatch and the incubation period was started at the time of complete egg hatch. At the end of the incubation period, the covered plants were removed from the cage for all treatments and the number of live and dead insects inside of the covered area were counted. In addition, we also evaluated the growth of several tomato plants both with and without 3D spacer fabrics to determine if there were any negative effects due to reduced light transmission.

Abrasion Testing

Figure 5A:
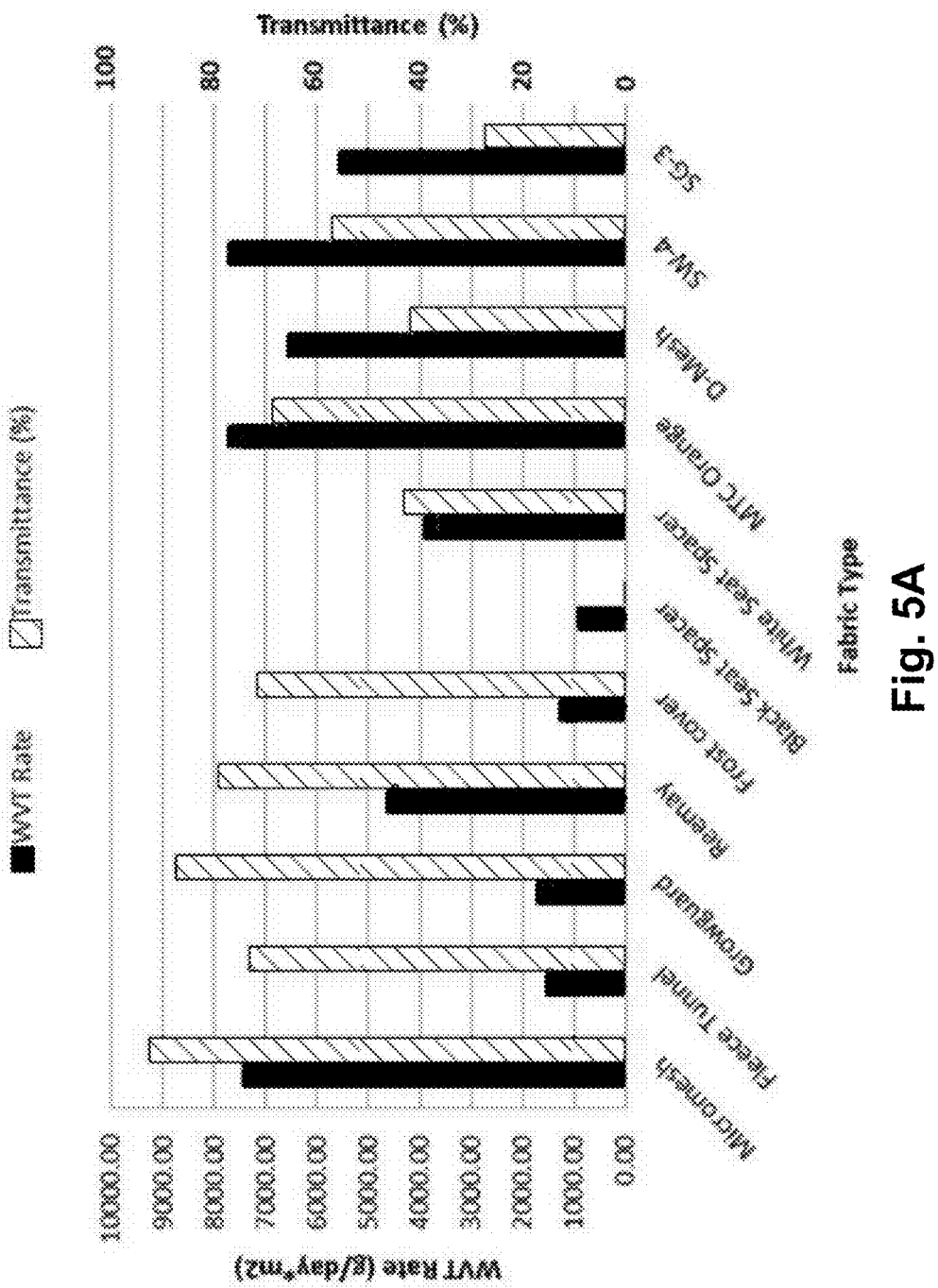
FIG. 5A is a graph of the water vapor transmission ($g/day*m^2$) along the left axis and the light transmittance (%) along the right axis for a variety of fabrics tested.
Figure 5B:
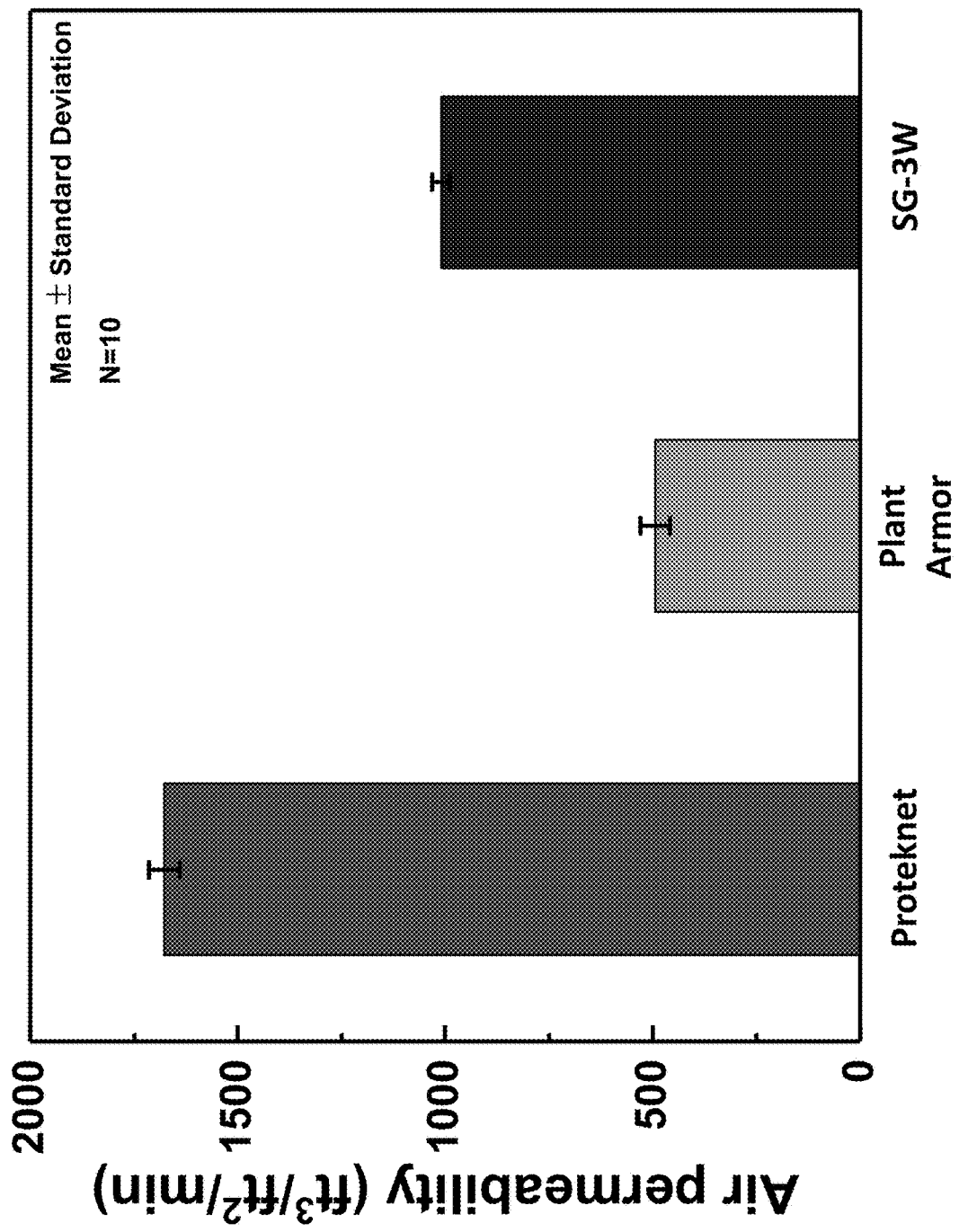
FIG. 5B is a graph of air permeability of a variety of fabrics.
Figure 5C:
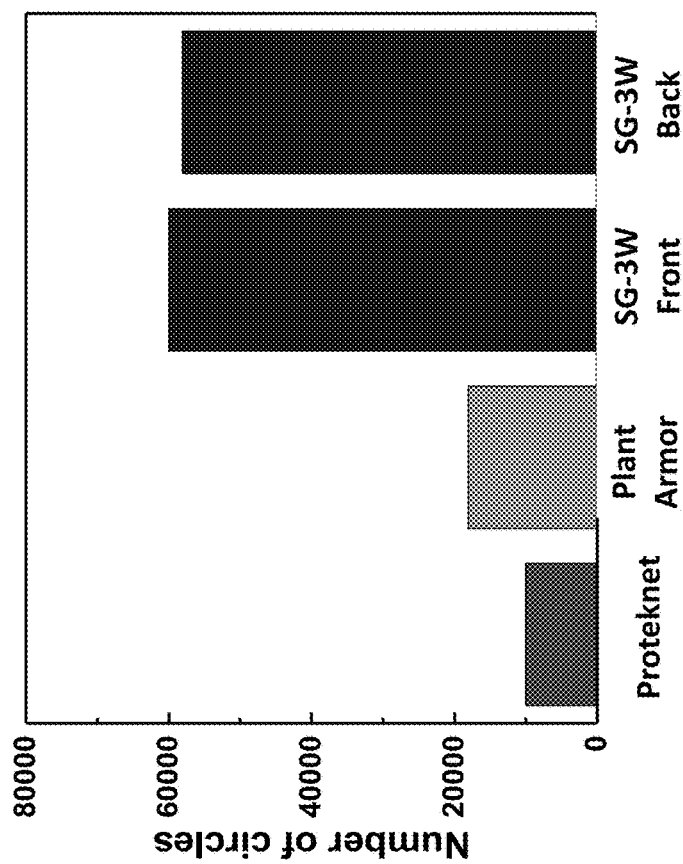
FIGS. 5C and 5D show results from abrasion testing.
Figure 5D:
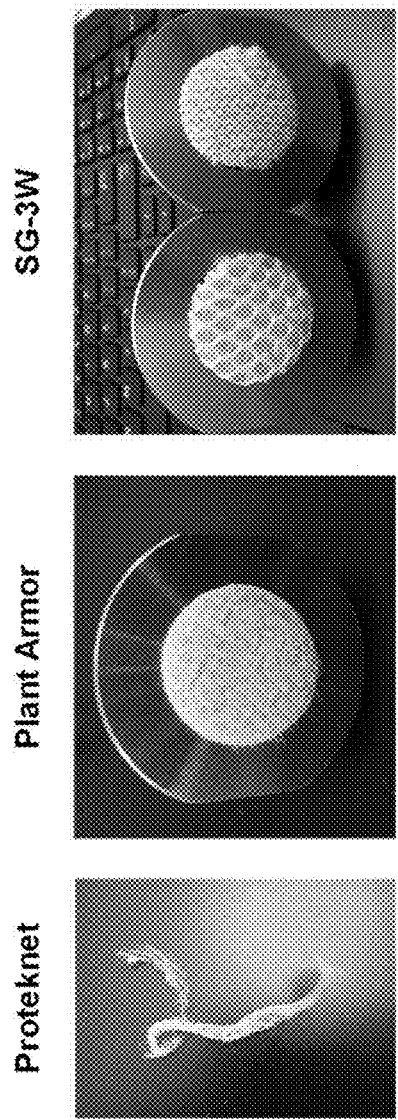

Fabrics were tested according to the Martindale abrasion test method (ASTM D4966-98) under standard atmosphere, 21±1° C. and 65±2% relative humidity. The standard abradant fabric used was a plain weave, crossbred, worsted wool fabric with circular shape (D=140 mm). The specimens were H, P, bonded fabrics, and woven fabric (as reference) with circular shape (D=38 mm). The weight is 9±0.2 kPa for apparel fabrics and 12±0.3 kPa for upholstery fabrics. As shown in FIGS. 5C and 5D, the SG-3W and Plant Armor specimens withstood higher abrasion than the Proteknet control fabric. The circle numbers in FIG. 5C represent the number of cycles of abrasion (larger means longer abrasion duration). The end point is reached on a knitted fabric when a hole appears.

Results and Discussions

Transmission Analysis

Small sample swatches of each agricultural textile and 3D spacer fabric were prepared for analysis with the BYK haze meter to determine light transmission, and for measuring moisture vapor transmission rate (MVTR) and air permeability. The samples were run in each process in triplicate by a single operator to minimize human error in the measurements. A summary of the transmission analyses is plotted below (Tables 1A-1B, FIGS. 5A-5B).

TABLE 1A

Transmission data for various fabrics:

| Application Type | Fabric | WVT rate | Transmittance |
|---|---|---|---|
| Agricultural | Micromesh | 7476.28 | 92.83 |
| Agricultural | Fleece Tunnel | 1570.99 | 73.50 |
| Agricultural | Growguard | 1777.37 | 87.63 |
| Agricultural | Reemay | 4676.09 | 79.43 |
| Agricultural | Frost cover | 1315.60 | 71.77 |
| Cushions | Black Seat 3D Spacer | 955.38 | 0.03 |
| Cushions | White Seat 3D Spacer | 3947.56 | 43.33 |
| Custom - MMC | Orange MMC 3D Spacer | 7746.32 | 68.93 |
| Bedding | D-Mesh 3D spacer | 6578.25 | 42.20 |
| Apparel | SW-4 3D spacer | 7736.22 | 57.40 |
| Apparel | SG-3 3D spacer | 5594.83 | 27.63 |

TABLE 1B

| Sample ID - replicate | Weight 1 grams | Weight 2 grams | W1 - W2 grams | WVT g/h·m$^2$ | MVTR g/m$^2$·24hrs |
|---|---|---|---|---|---|
| proteknet-1 | 255.497 | 253.326 | 2.171 | | |
| proteknet -2 | 253.819 | 251.619 | 2.2 | | |
| proteknet -3 | 265.217 | 263.04 | 2.177 | | |
| Avg. | | | 2.18 | 17.2 | 412.8 |
| sg-3w-1 | 244.97 | 242.505 | 2.465 | | |
| sg-3w-2 | 248.453 | 246.571 | 1.882 | | |
| sg-3w-3 | 246.64 | 245.058 | 1.582 | | |
| Avg. | | | 1.98 | 15.62 | 374.93 |
| plant armor-1 | 255.33 | 253.087 | 2.243 | | |
| plant armor-2 | 257.988 | 254.891 | 3.097 | | |
| plant armor-3 | 258.573 | 256.205 | 2.368 | | |
| Avg. | | | 2.57 | 20.28 | 486.65 |

TABLE 1B-continued

| Sample ID - replicate | Weight 1 grams | Weight 2 grams | W1 - W2 grams | WVT g/h·m² | MVTR g/m²·24hrs |
|---|---|---|---|---|---|
| Control-1 | 237.621 | 232.492 | 5.129 | | |
| Control-2 | 242.366 | 237.892 | 4.474 | | |
| Control-3 | 239.418 | 235.669 | 3.749 | | |
| Avg. | | | 4.45 | 35.11 | 842.64 |

Table 1B. Moisture Vapor Transmission Rate is the rate at which water vapor travels through a fabric. MVTR has the units of water weight over a fabric area per 24 hours. Test conditions: Temperature 23 °C., Relative humidity 50% Equation:

$MVTR = \frac{W_1 - W_2}{A} / 24hours$ where $W_1 - W_2$ is water weight loss, grams; $A$ is testing area, $0.0005281 m^2$.

The fabric that demonstrated the best combination of moisture and light transmission was the ultra-thin, small pore commercial product called Micromesh. The other agricultural textiles were thin enough to allow decent light transmission, but did poorly in vapor transport. Most of the 3D spacer fabrics had excellent at air/vapor transport due to their open cell structure, however the thicker materials with darker colors had very poor light transmission. The custom 3D spacer made by MMC textiles had excellent properties but was determined to be of a pore size in excess of what would be an effective insect barrier. The D-Mesh, SW-4 and SG-3 appeared to have the best qualities for insect penetration testing.

Petri Dish Penetration Test

As a point of reference, control experiments were run without any fabric at all as well as with a thin mosquito cloth, neither of which provided any barrier to penetration by the budworms. From the preliminary studies we determined that the open celled SW-4 3D spacer textile provides no significant benefit by itself as shown in Table 2 below. However, when treated with tackifier alone, the SW-4 demonstrates over a 70% reduction in average penetration by the budworms. This reduction is increased also by the presence of permethrin insecticide within the treatment, however these treatments kill 100% of the insects that engage it. The more tortuous 3D spacer, SG-3 tested extremely well and showed almost a 70% reduction in penetration even in its untreated state. The tackifier treated SG-3 will be highly effective at blocking budworm penetration.

TABLE 2

Data for budworm penetration on various test fabrics.

| | 3D Spacer: SW-4 | Penetration (0-20) | | | % | |
|---|---|---|---|---|---|---|
| Treatment | Sample | 1 | 2 | 3 | Reduction | Mortality |
| ~ | No Barrier | 20 | 20 | 20 | 0.0 | 0% |
| ~ | Mosquito cloth | 20 | 20 | 20 | 0.0 | 0% |
| ~ | 976-003-Control | 18 | 20 | 20 | 3.3 | 0% |
| Repellent | 976-003-Y | 16 | 7 | 10 | 45.0 | 0% |
| Repellent | 976-003-X | 15 | 10 | 12 | 38.3 | 0% |
| Insecticide | 976-003-Z | 15 | 14 | 12 | 31.7 | 100% |
| Tackifier | 976-002-E | 6 | 6 | 4 | 73.3 | 0% |
| Tackifier/ Repellent | 976-002-B | 7 | 8 | 9 | 60.0 | 0% |
| Tackifier/ Repellent | 976-002-A | 8 | 12 | 5 | 58.3 | 0% |
| Tackifier/ Insecticide | 976-002-D | 4 | 5 | 4 | 78.3 | 100% |
| Tackifier/ Repellent | 976-002-C | 6 | 7 | 8 | 65.0 | 0% |

TABLE 2-continued

Data for budworm penetration on various test fabrics.

| | 3D Spacer: SG-3 | Penetration (0-20) | | | % | |
|---|---|---|---|---|---|---|
| Treatment | Sample | 1 | 2 | 3 | Reduction | Mortality |
| ~ | 976-003-Control | 7 | 7 | 5 | 68.3 | 0% |
| Repellent | 976-003-Y | 4 | 5 | 4 | 78.3 | 0% |
| Repellent | 976-003-X | 7 | 6 | 8 | 65.0 | 0% |
| Insecticide | 976-003-Z | 7 | 7 | 5 | 68.3 | 100% |
| Tackifier | 976-002-E | 4 | 5 | 4 | 78.3 | 0% |
| Tackifier/ Repellent | 976-002-B | 6 | 7 | 3 | 73.3 | 0% |
| Tackifier/ Repellent | 976-002-A | 5 | 5 | 5 | 75.0 | 0% |
| Tackifier/ Insecticide | 976-002-D | 0 | 1 | 1 | 96.7 | 100% |
| Tackifier/ Repellent | 976-002-C | 4 | 4 | 5 | 78.3 | 0% |

| | 3D Spacer: D-Mesh | Penetration (0-20) | | | % | |
|---|---|---|---|---|---|---|
| Treatment | Sample | 1 | 2 | 3 | Reduction | Mortality |
| ~ | 976-003-Control | 15 | 19 | 13 | 21.7 | 0% |
| Repellent | 976-003-Y | 11 | 13 | 15 | 35.0 | 0% |
| Repellent | 976-003-X | 13 | 11 | 18 | 30.0 | 0% |
| Insecticide | 976-003-Z | 10 | 15 | 16 | 31.7 | 100% |
| Tackifier | 976-002-E | 14 | 16 | 10 | 33.3 | 0% |
| Tackifier/ Repellent | 976-002-B | 11 | 13 | 12 | 40.0 | 0% |
| Tackifier/ Repellent | 976-002-A | 13 | 9 | 13 | 41.7 | 0% |
| Tackifier/ Insecticide | 976-002-D | 12 | 11 | 10 | 45.0 | 100% |
| Tackifier/ Repellent | 976-002-C | 14 | 9 | 12 | 41.7 | 0% |

Green House Testing

Figure 6:
FIG. 6 is an image of a control plant with moths.
Figure 7:
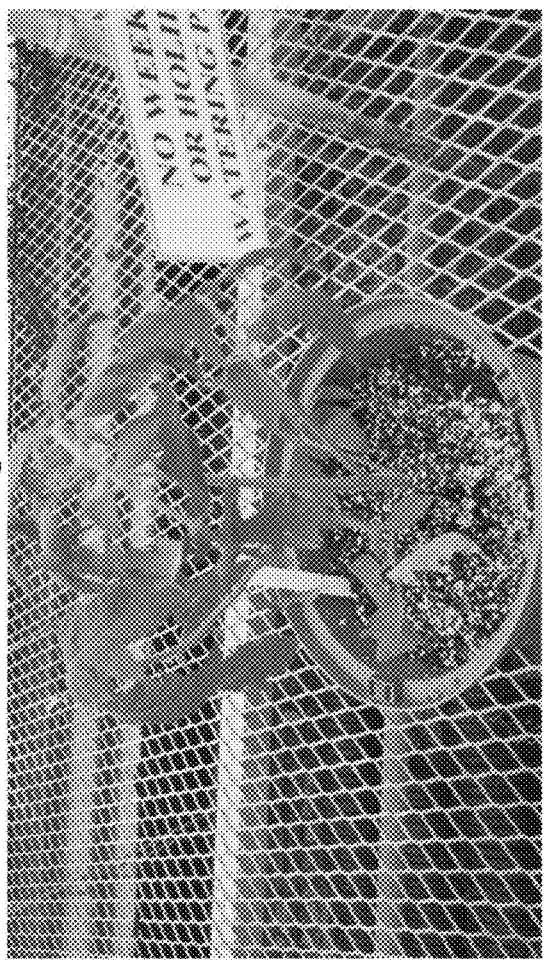
FIG. 7 is an image of a test plant that was covered by a textile; there is no caterpillar damage.
Figures 10, 11:
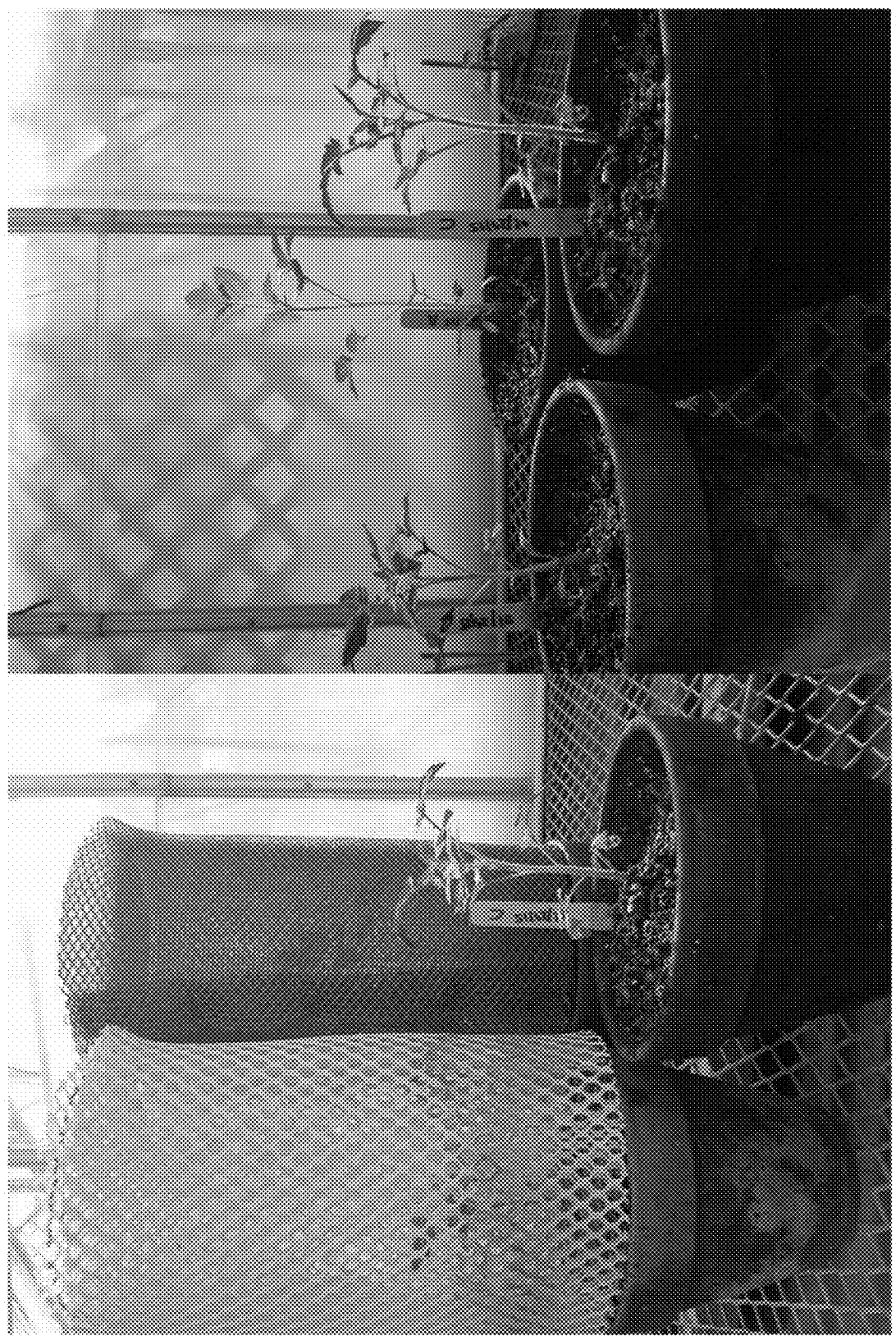
FIG. 10 is an image of the growth study setup.
FIG. 11 is an image of the growth study plants at day 6.
Figure 12:
FIG. 12 is an image of the growth study plants at day 12.
Figure 13:
FIG. 13 is an image of the plant size comparisons from the growth study.

Tomato plants growing in pots and pest free were covered in toto with the textile with the cloth sealed to the top rim of the pot with an elastic band and adhesive tape/clips to prevent insect movement between the pot and cloth. These covered plants then were introduced into the infested cage and incubated under 18:6 L:D conditions in the green house for up to 14 days. The pest insects during this time period were given the opportunity to migrate toward the covered plants. The infested plants were not watered to enhance movement to the uninfested plants. The control tomato plant that was not protected by our fabric had approximately 480 budworm on the plant (FIG. 6), while the treatment plant (covered with D-Mesh fabric) had zero budworm on the plant itself, and 3 budworms stuck in the 3D spacer fabric (Table 3, FIG. 7). Also the SG-3 fabric covered plant had zero budworms on the plant with 1 budworm tangled in the 3D spacer fabric. Both plants covered with fabric had normal growth.

TABLE 3

Adult moth cage studies of 30 spacer fabrics with tomato plants.

| Fabric | D-mesh | | Control | | SG-3 | | Control | | SG-3 Perm. Control | |
|---|---|---|---|---|---|---|---|---|---|---|
| Total Eggs | 1567 | 1613 | 1230 | 1433 | 968 | 1359 | 1220 | 1498 | 1336 | 1336 |
| Eggs on plant | 0 | 0 | 480 | 380 | 0 | 0 | 310 | 420 | 0 | 370 |
| Eggs on fabric | 0 | 2 | | | 3 | 1 | | | 0 | 0 |

The condition of the plants was documented with photos (FIGS. 6-9) and right away there was a clear impact of the insects on the control plant (plant is dying). These experiments were replicated two more times. When looking at where the moths were depositing their eggs, there were 1555 eggs deposited on the cage, 3 placed on the cloth covering the plant. What this means is that the moths just are not detecting the plant and showing no preference for laying their eggs closest to the plant. The plants are effectively invisible to the moths.

Plant Growth Studies

Plant growth studies (FIGS. 10-13, Table 4) were conducted in the green house at ambient temperatures and an average of 40% humidity. Monitoring the plant growth of the tomato plants covered by the SG-3 and D-Mesh 3D spacer fabrics as compared to an uncovered control revealed additional information. The SG-3 fabric, while the absolute best performer in preventing bug penetration at both the dish and cage level, has a clearly negative effect on the plant growth, as the plant grows to over twice its initial height while actually reducing the number of leaves. This behavior is typically indicative of this plant under highly shaded conditions such as beneath a dense forest canopy where the plant must extend itself to collect more sunlight. Both the control plant and the plant covered with the D-Mesh material exhibited a steady growth of over 50% in height and added additional leaves. This data suggests that at least in the case of tomato plants, the D-Mesh 3D spacer provides the best insect barrier without detriment to the health of the plant.

Outdoor plant growth studies were also conducted during summer months (FIGS. 14A-14B). Each textile type and its control (uncovered plant) was conducted in the same raised bed and there were three raised beds, one for each of the three textile types tested. Bed to bed variations were caused by different soil conditions, level of fertilization of the soil, and locations behind the research building. SG-3W and Plant Armor specimens showed significantly increased growth over the uncovered samples and the samples grown with commercially available Proteknet single layer fabric.

plant growth. The new 3D spacer fabric technology has considerable advantages over competitive insect control technologies with regards to environmental friendliness and a superior combination of insect barrier and air/water/light transmission. Insecticides such as pyrethroids, N-methyl carbamates, neonicotinoids and organophosphates have been effective defeat agents for decades, however there is growing concern among consumers about negative health effects stemming from use of these agents on fruits and vegetables. In addition, there are potentially harmful effects for local environments from extended use of these chemicals and insects have developed behavioral and physiological mechanisms of resistance to chemical and biological pesticides. Our approach is entirely chemical, protein and nucleic acid-free, relying on the unique geometry of the 3D spacer textile to mask the location of plants without any toxic effects. Other insect control technologies rely on presenting a physical barrier such as plastic sheet, nonwoven cloths or netting to surround the plants. These other insect control technologies materials can have negative effects on the plant growth by limiting air, light and water transmission. Additionally, these fabrics or nets do not make the plant invisible to the insects, leading to second generation larval infestation when the initial adults spawn their young within the fibers of the barrier products. This example demonstrates that insecticides or sticky substances added to the 3D textile can enhance both the textile physical barrier effect as well as the pesticide action of the insecticide or sticky agent. Also the 3D structure allows for the pesticide or sticky agent to be hidden in the middle layer protecting from contact and transfer of the material to objects that might contact the cloth for example like plant contamination or transfer to human or animal subjects. This also provides protection to the environment and pesticide contamination of the plant and product made from the plant material which as one example would permit pesticide free food. This also reduces the need for general spraying of pesticides that contaminates the environment and prolongs the life of the pesticide or sticky substance by shielding it internally in the 3D structure and from environmental factors that would reduce its pesticide activity.

TABLE 4

Plant Growth Study Data showing total plant height over 13 days.

| Days | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Plant Height (cm) | | | | | | | | | | | | | | |
| SG-3 | 12 | 12.5 | 13 | 14 | 15 | 17 | 19 | 22 | 23 | 24 | 25 | 26 | 27 | 29 |
| D-mesh | 11 | 11 | 11 | 12 | 12.5 | 13 | 13 | 13 | 13.5 | 14 | 14 | 15 | 16.5 | 17 |
| Control | 11 | 11 | 11 | 12 | 12.5 | 13 | 13 | 13.5 | 14 | 14 | 14.5 | 15.5 | 17 | 17 |

The main focus of this study was to develop an insect shield that will eliminate the need for agricultural pesticides. Conventional 2D textiles have limitations regarding applications as impenetrable insect barriers as discussed in the previous section. Hence, a combination of approaches to textile design can be utilized in order to develop better insect resistant textiles for crop protection which are more porous and provide not only size exclusion but traps insects. This is essentially a new area of research for agriculture.

This example demonstrated an effective, porous insect resistant barrier fabric. This fabric will have superior properties for insect resistance compared with current commercial agricultural fabrics in the areas of improved insect capture, repellency, or kill, while maintaining excellent light, air, and moisture transmission resulting in optimal The most effective fabric has a 3-D multilayer structure. The front outer layer has large honeycomb-shape opens, while the back outer layer has small parallelogram opens. Pile yarns in the middle are parallel-aligned filaments connecting two outer layers. The optimal value for maximum pore size is about 100 μm, which mainly depends on the pore size of back outer layer. The optimal thickness is about 40 mm which can resist thrips and also saves material. The optimal air permeability and MVTR are 1000 ft$^3$/ft$^2$/min and 500 g/m$^2$·24 hrs, respectively, which affected by the both layers and pile yarns. The outer layers of SW-4 fabric are plain pattern. The fabric also has a 3-D multilayer structure. The pile yarns show a parallel-curved distribution in the view of wale direction and a cross-arranged distribution in the view of course direction. The length of pile yarns in SW-4 is about 2 mm to 10 mm. Pore size of the SW-4 is around 50 μm to 80 μm which determined by the pattern of outer layers.

The D-mesh is a single layer mesh structure. It has large honeycomb-shape opens. The pore size is around 100 μm to 400 μm, and the thickness is around 0.2 mm to 0.8 mm.

The final Plant Armor fabric was constructed using two different yarns, a 9 denier monofilament polyester for the inner layer and a 70 denier bright multifilament polyester for the front and back outer layers. This outer layer yarn contains only 0.05% Titanium Dioxide (TiO2), a whitening agent in fabric to make it opaque. The whitening agent was reduced to a minimum for maximum light penetration. The bright polyester multifilament captures more light due to the increased surface area, causing the opaqueness to decrease. The decrease in denier of the monofilament decreased the opaqueness due to its fineness. The machine used is an 18 gauge jacquard knitting machine.

Figure 15A:
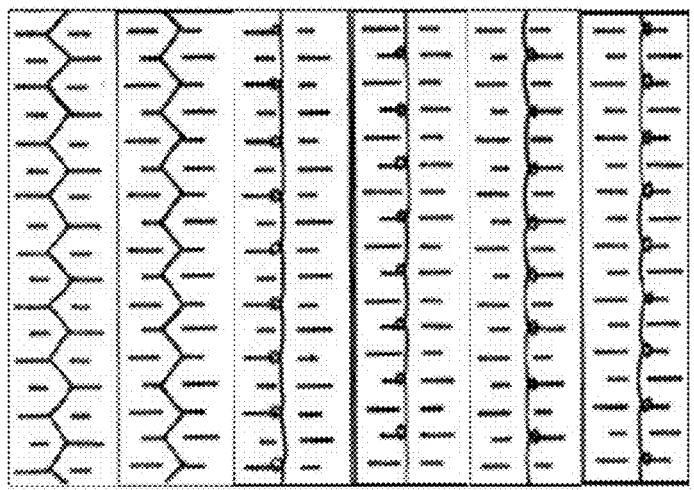
FIGS. 15A and 15B show the knit construction of the final Plant Amour fabric, and FIG. 15C provides the D/C gap evaluations.
Figure 15B:
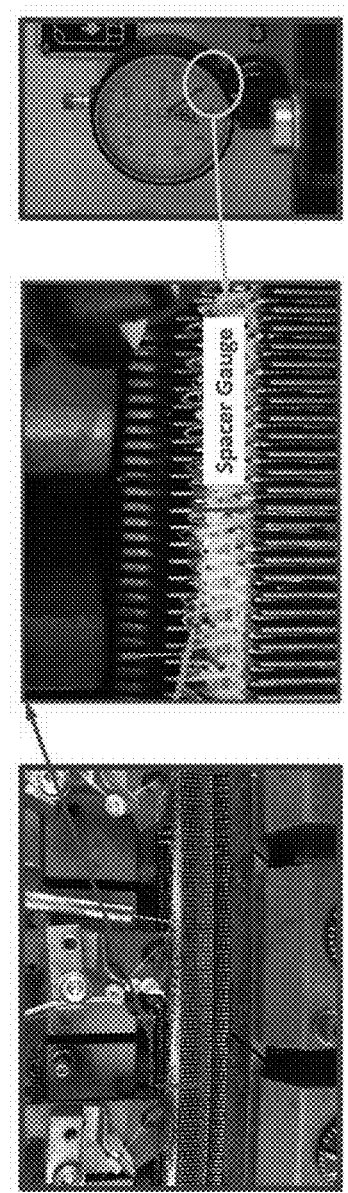

The knit construction of the final Plant Armor fabric is shown in FIGS. 15A and 15B. The most successful fabric in lab and subsequent field trials was selected due to its stitch density, thickness as well as air and light permeability. The ground feeds were multifilament polyester (Bright, 70 denier) and spacer feeds were monofilament polyester (9 denier). The resulting fabric had improved coverage and thickness. The Bright polyester allowed the opaqueness to decrease. The decrease in denier of the monofilament decreased the opaqueness as well, resulting in better light transmission. The fabrics were manufactured on an OVJA 1.6 E 3 wt weft knitting spacer machine, with a machine diameter of 30" and gauge of 18 npi.

Figure 15C:
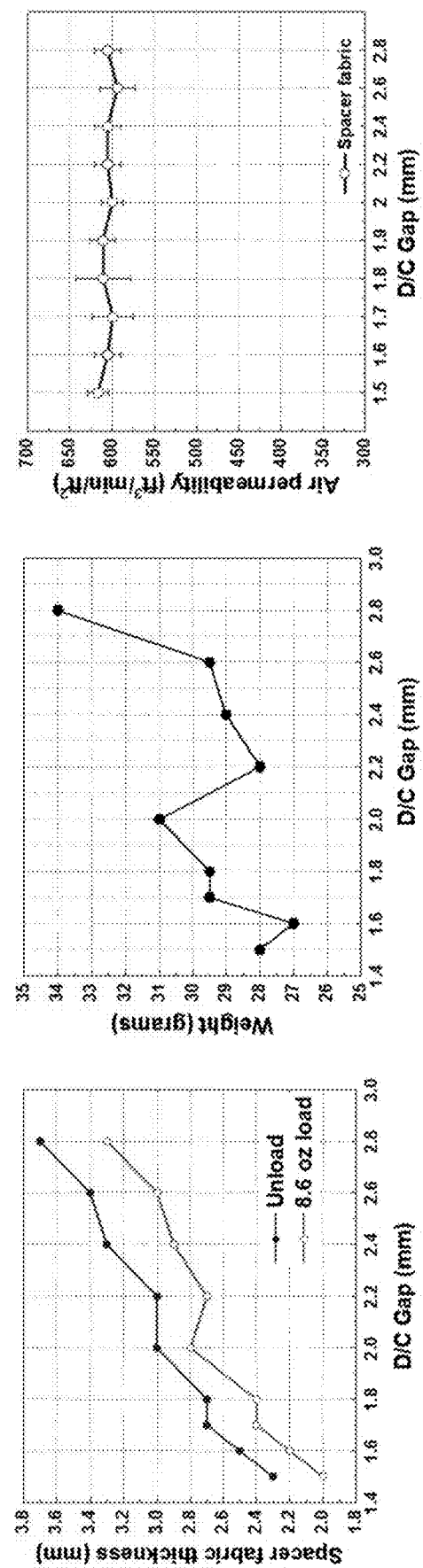

Once the fabric construction was finalized, the thickness and porosity of the fabric could be controlled by increasing the gap between the two needle beds, referred to as raising the dial height or D/C gap in FIG. 15C, thereby increasing the amount of yarn usage as well as the weight and thickness of the fabric without drastically affecting the air permeability, again shown in FIG. 15C.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. An agricultural textile comprising an outermost fabric layer, an innermost fabric layer, and a plurality of filaments connecting the outermost fabric layer and the innermost fabric layer, such that the plurality of filaments form a tortuous path in an internal core of the textile;
    wherein the outermost fabric layer comprises a plurality of pores having a pore size of about 50-100 μm; and
    wherein the outermost fabric layer and the innermost fabric layer comprise a bright multifilament polyester yarn having a denier of about 60 to 100, and wherein the bright multifilament polyester yarn comprises about 0.05% $TiO_2$.

2. The agricultural textile according to claim 1, wherein the plurality of filaments are monofilaments having a denier of about 9.

3. The agricultural textile according to claim 1, wherein the agricultural textile is compressible by up to 30% of its thickness with less than a 10% change in the pore diameter.

4. The agricultural textile according to claim 1, wherein the outermost fabric layer and the innermost fabric layer do not shear towards each other.

5. The agricultural textile according to claim 1, wherein one or more of the outermost fabric layer, the innermost fabric layer, and the plurality of filaments comprise a tackifier.

6. The agricultural textile according to claim 5, wherein the tackifier is selected from the group consisting a polysaccharide gum, a gum rosin, a gum rosin ester, an aliphatic hydrocarbon resin, an aromatic modified aliphatic hydrocarbon resin, a wood rosin, a wood rosin ester, a tall oil rosin, a tall oil rosin ester, a polyterpene, an aromatic modified polyterpenes, a hydrogenated aliphatic resin, a hydrogenated aliphatic aromatic resin, and a combination thereof.

7. The agricultural textile according to claim 1, wherein one or more of the outermost fabric layer, the innermost fabric layer, and the plurality of filaments comprise an insecticide.

8. The agricultural textile according to claim 7, wherein the insecticide is selected from the group consisting of an organophosphate, a carbamate, a pyrethroid, and a combination thereof.

9. The agricultural textile according to claim 8, wherein the insecticide is a pyrethroid, and wherein the pyrethroid is selected from the group consisting of permethrin, bifenthrin, cyfluthrin, fluvalinate, fen-propathrin, and a combination thereof.

10. The agricultural textile according to claim 1, wherein one or more of the outermost fabric layer, the innermost fabric layer, and the plurality of filaments comprise one or more of a fungicide and an insect repellant.

11. The agricultural textile according to claim 10, wherein the repellent is geraniol.

12. The agricultural textile according to claim 1, wherein one or both of the outermost fabric layer and the innermost fabric layer are warp knitted.

13. The agricultural textile according to claim 1, wherein the agricultural textile has a water vapor transmission rate of about 5000 g/day*m$^2$ to about 8000 g/day*m$^2$.

14. The agricultural textile according to claim 1, wherein the agricultural textile has a light transmittance of about 25% to about 60%.

* * * * *